United States Patent [19]

Hayashi

[11] Patent Number: 4,739,485
[45] Date of Patent: Apr. 19, 1988

[54] VEHICLE SPEED CONTROL APPARATUS

[75] Inventor: Kazuhiko Hayashi, Toyota, Japan

[73] Assignee: Toyota Jidosha Kabushiki Kaisha, Aichi, Japan

[21] Appl. No.: 761,599

[22] Filed: Aug. 1, 1985

[30] Foreign Application Priority Data

Aug. 8, 1984 [JP] Japan .................. 59-166257

[51] Int. Cl.[4] ............. B60K 31/00; F02M 51/00
[52] U.S. Cl. ................ 364/431.07; 364/431.05; 123/492
[58] Field of Search ............ 364/424, 426, 431.05, 364/565, 431.07; 324/160, 161; 180/170, 176–179; 123/352, 349, 350, 492

[56] References Cited

U.S. PATENT DOCUMENTS

| | | | |
|---|---|---|---|
| 3,570,622 | 3/1971 | Wisner | 180/105 |
| 3,644,813 | 2/1972 | Schoendorff | 318/569 X |
| 3,949,359 | 4/1976 | Sorkin | 340/54 |
| 4,245,713 | 1/1981 | Mochida et al. | 180/176 |
| 4,291,656 | 9/1981 | Miyagi et al. | 123/320 |
| 4,402,376 | 9/1983 | Hayashi et al. | 180/179 |
| 4,436,072 | 3/1984 | Suzuki et al. | 123/352 |
| 4,470,478 | 9/1984 | Hayashi et al. | 180/176 |
| 4,474,155 | 10/1984 | Sagues | 123/352 |
| 4,495,578 | 1/1985 | Sibley et al. | 364/426 |
| 4,590,563 | 5/1986 | Matsumura et al. | 364/558 |
| 4,598,370 | 7/1986 | Nakajima et al. | 364/426 |

FOREIGN PATENT DOCUMENTS 2046478 of 0000 United Kingdom .

Primary Examiner—Parshotam S. Lall
Assistant Examiner—Thomas G. Black
Attorney, Agent, or Firm—Parkhurst & Oliff

[57] ABSTRACT

A vehicle speed control apparatus is provided which includes a vehicle speed sensor, a setting switch, a memory, a comparator, a timer, a quick responser and an actuator. The vehicle speed sensor detects and outputs the actual vehicle speed into the memory and the comparator. A driver operates the setting switch when the actual vehicle speed equals the desired vehicle speed. The setting switch outputs an initial signal for automatic control of the vehicle speed to the memory and the quick responser. The value of the desired vehicle speed is set in the memory which outputs a desired vehicle speed signal to the comparator and the timer. The comparator determines a difference between the actual vehicle speed and the desired vehicle speed, and outputs a manipulation signal into the actuator in accordance with this difference. When the quick responser receives the initial signal from the setting switch it outputs a maximum value signal to the actuator during a time period which is set in the memory according to a relationship between desired vehicle speed and time period. The actuator opens a throttle valve to a maximum degree during this time period. The timer receives the desired vehicle speed signal from the memory, and counts down the corresponding time period. When the time period has passed and the timer reaches 'Zero', the timer outputs an end signal to the quick responser. The actuator then adjusts the opening degree of the throttle valve according to the difference between the value of the desired vehicle speed and the value of the actual vehicle speed. This provides automatic control of vehicle speed without large initial decreases or increases in vehicle speed.

35 Claims, 13 Drawing Sheets

VEHICLE SPEED CONTROL APPARATUS

BACKGROUND OF THE INVENTION

The present invention relates to a vehicle speed control apparatus which automatically maintains a vehicle speed at a desired vehicle speed without adjustments by the driver. More particularly, the present invention relates to improvements for reducing an initial decrease in the actual vehicle speed after the desired vehicle speed is set in a memory.

FIG. 12 shows a diagram of actual vehicle speed after the commencement of the acceleration of the vehicle having a first conventional vehicle speed control apparatus. In FIG. 12, a value 'Vset' of a desired vehicle speed is set in the memory of the vehicle speed control apparatus at an initial time 'ti' of automatic vehicle speed control. This conventional vehicle speed control apparatus can maintain the value 'Vset' of the desired vehicle speed after a first time period '$T_1$' has passed.

However, a vehicle with this speed control apparatus suffers a long initial decrease in the actual vehicle speed, after the value 'Vset' of the desired vehicle speed is set in the memory.

When the value 'Vset' of the desired vehicle speed is set, the driver stops manual operation on the accelerator pedal which adjusts the degree of opening of a throttle valve and an actuator of a conventional vehicle speed control apparatus controls the degree of the opening of the throttle valve. However, the conventional actuator has a time lag in its operation. As a result, the degree of opening of the throttle valve is smaller than desired and the valve of the actual vehicle speed will be too small. Thus, the conventional vehicle speed control apparatus has a long initial decrease in the actual vehicle speed caused by the time lag in the operation of the actuator.

A second conventional vehicle speed control apparatus includes a quick response means which can output a maximum value signal when the desired speed is set in a memory. As a result, the actuator of this vehicle speed control apparatus will quickly open a throttle valve to a maximum amount, and the vehicle speed will quickly increase. This vehicle speed control apparatus therefore has an initial decrease in the deisred vehicle speed for a time period '$T_2$' as shown in FIG. 13 which is shorter than the initial time '$T_1$' for decrease in vehicle speed in the first conventional control apparatus.

However, when the quick response means of this second conventional vehicle speed control apparatus opens the throttle valve to the maximum amount during the time period '$T_2$' the actual vehicle speed of the vehicle increases to more than the value 'Vset' of the desired vehicle speed, after the time period '$T_2$' has passed.

The actual vehicle speed then decreases to the value 'Vset' of the desired vehicle speed after a time period '$T_3$' has passed.

SUMMARY OF THE INVENTION

The present invention was developed in view of the foregoing background and to overcome the foregoing drawbacks. It is accordingly an object of this invention to provide a vehicle speed control apparatus which can reduce an initial decrease in actual vehicle speed when a desired speed is set in a memory and which can prevent an excess increase in the actual vehicle speed.

To achieve the above object, a vehicle speed control apparatus is provided with a timer for timing a period during which a quick response means outputs a maximum value signal to an actuator in accordance with a relationship between desired vehicle speed and time period set in the memory of the vehicle speed control apparatus.

The vehicle speed control apparatus according to the present invention includes a vehicle speed sensor, a setting switch, a memorizing means, (i.e., a means to set a value of the vehicle speed in a memory), a comparator, a timer, a quick response means and an actuator. The vehicle speed sensor detects the actual vehicle speed and outputs the actual vehicle speed signal into the memorizing means and into the comparator. When the value of the actual vehicle speed is substantially equal to a value of the desired vehicle speed, the driver operates the setting switch. An initial signal is then outputted to the memorizing means and the quick response means. The value of the desired vehicle speed is set in the memory of the memorizing means and the memorizing means outputs a desired vehicle speed signal to the comparator and the timer. The comparator compares the value of the actual vehicle speed received from the vehicle speed sensor with the value of the desired vehicle speed received from the memorizing means, and outputs a manipulation signal to the actuator in accordance with the difference between the value of the actual vehicle speed and the value of the desired vehicle speed.

The quick response means receives the initial signal from the setting switch, and outputs a maximum value signal to the actuator during the time period set in the memory as the relationship between desired vehicle speed and time period (i.e. for each vehicle speed a specified time period is set in the memory). The timer receives the desired vehicle speed signal from the memorizing means, and counts down the value of the corresponding time period. When the time period has passed and the timer reaches 'Zero', the timer outputs an end signal into the quick response means. During the time period, the actuator receives a maximum value signal from the quick response means and opens the throttle valve to the maximum amount. As a result, the actual vehicle speed quickly approaches the desired vehicle speed. The maximum value signal is stopped, when the timer outputs the end signal to the quick response means. The actuator then adjusts the opening amount of the throttle valve according to the difference between the value of the desired vehicle speed and the value of the actual vehicle speed. Therefore, the vehicle speed control apparatus can reduce the initial decrease in the actual vehicle speed when the desired speed is set without increasing the actual vehicle speed to exceed to the desired vehicle speed.

BRIEF DESCRIPTION OF THE DRAWINGS

The above object, features and advantages of the present invention will become more apparent from the description of the invention which follows, taken in conjunction with the accompanying drawings, wherein like reference numerals denote like elements.

DETAILED DESCRIPTION OF THE PREFERRED EMBODIMENT

The present invention will be described in detail with reference to the accompanying drawings which illustrate a preferred embodiment according to the present invention.

Figure 1:
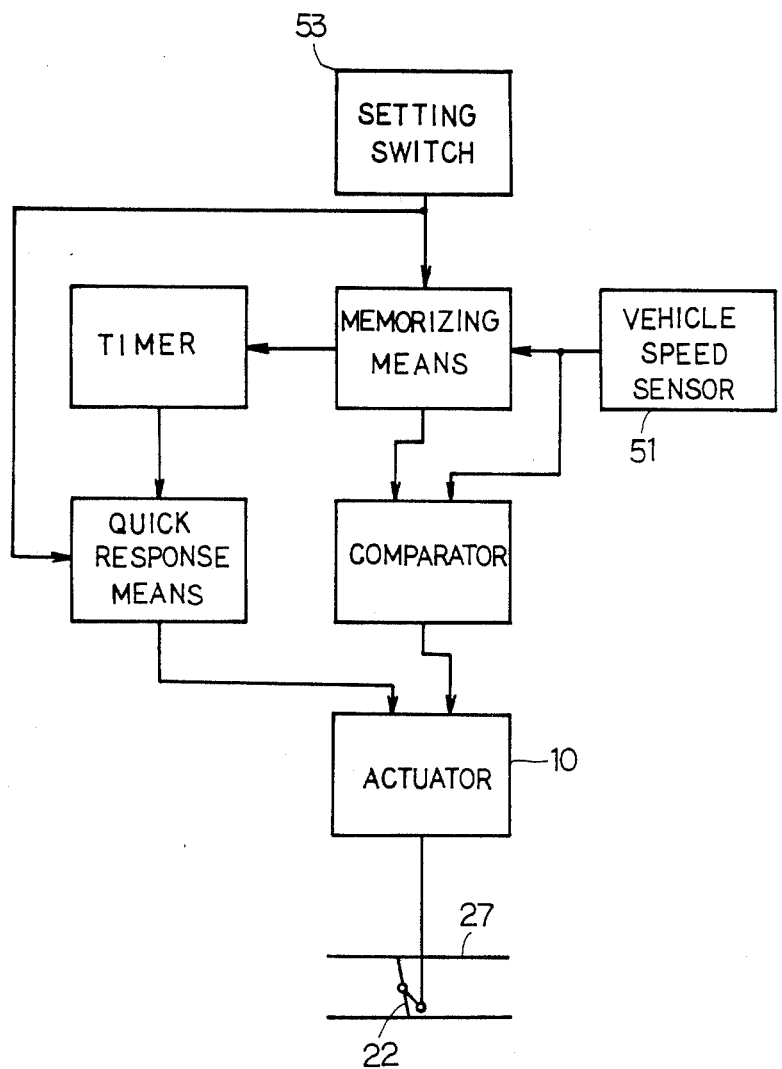
FIG. 1 is a block diagram of the present invention.

Referring to FIG. 1, a vehicle speed sensor 51 detects an actual vehicle speed and outputs an actual vehicle speed signal into a memorizing means and a comparator. When a value 'V' of the actual vehicle speed is equal to a value 'Vset' of the desired vehicle speed, a setting switch 53 is tripped by the driver. The setting switch 53 then outputs an initial signal for beginning to maintain the actual vehicle speed at the value 'Vset' of the desired vehicle speed. The memorizing means sets the value 'Vset' of the desired vehicle speed in its memory when the setting switch 53 outputs the initial signal, and the memorizing means outputs the desired vehicle speed signal into a comparator and a timer. The comparator compares the value 'V' of the actual vehicle speed received from the vehicle speed sensor 51 with the value 'Vset' of the desired vehicle speed received from the memorizing means, and outputs a manipulation signal into an actuator 10 in accordance with a difference 'ΔV' between the value 'V' of the actual vehicle speed and the value 'Vset' of the desired vehicle speed.

A quick response means receives the initial signal from the setting switch 53, and outputs a maximum value signal into the actuator during a time period which is set in a memory as the relationship between desired vehicle speed and time period (e.g. for each value of desired vehicle speed there is a corresponding time period). When the actuator 10 receives the manipulation signal from the comparator and the maximum value signal from the quick response means, the actuator 10 quickly opens a throttle valve 22 to a maximum opening degree.

A timer receives the desired vehicle speed signal from the memorizing means and counts down the value 'Tset' of the time period corresponding to the value 'Vset' of the desired vehicle speed. When the time period has passed and the timer reaches 'Zero', the timer outputs an end signal to the quick response means. The quick response means outputs a maximum value signal during the time period between the receipt of the initial signal from the setting switch 53 and the receipt of the end signal from the timer. The actuator 10 maintains the throttle valve 22 at maximum opening amount during this time period. As a result, the actual vehicle speed quickly approaches the value 'Vset' of the desired vehicle speed. When the timer outputs the end signal to the quick response means and the maximum value signal is stopped, the actuator 10 adjusts the opening amount of the throttle valve 22 according to the difference 'ΔV' between the value 'Vset' of the desired vehicle speed and the value 'V' of the actual vehicle speed.

Figure 2:
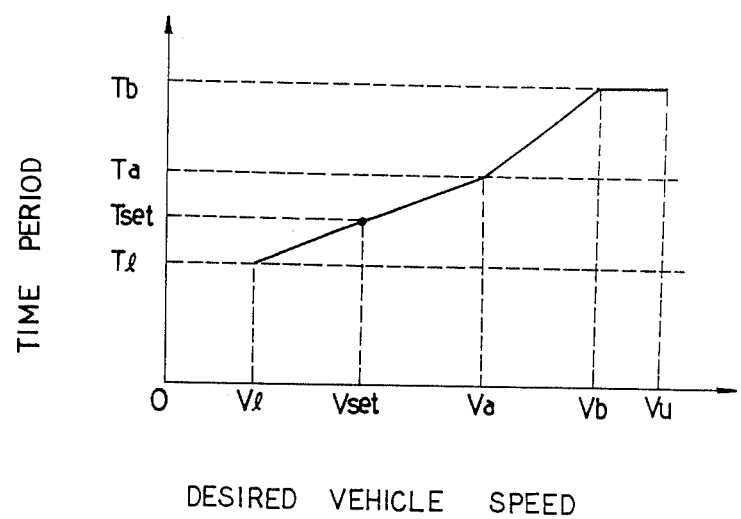
FIG. 2 is a graph showing the relationship between desired vehicle speed and time period, which is memorized in a read-only memory 'ROM'.

FIG. 2 shows the relationship between desired vehicle speed and time period for outputting a maximum value signal, which is set in a read-only memory 'ROM' 612. The 'ROM' is one of the memorizing means in a control circuit 60. As shown in FIG. 2, while the value 'Vset' of the desired vehicle speed in increased, generally, the time period for outputting a maximum value signal from the quick response means is increased.

Figure 3:
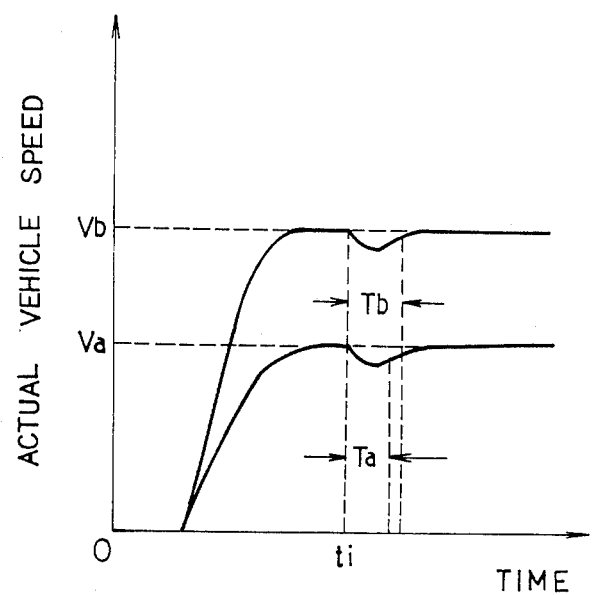
FIG. 3 is a graph showing the relationship between actual vehicle speed and time during control by the vehicle speed control apparatus according to the present invention.

As shown in FIG. 3, a vehicle equipped the vehicle speed control apparatus according to the present invention has a slight initial decrease in the actual vehicle speed, even when the desired value of the actual vehicle speed is high.

Figure 4:
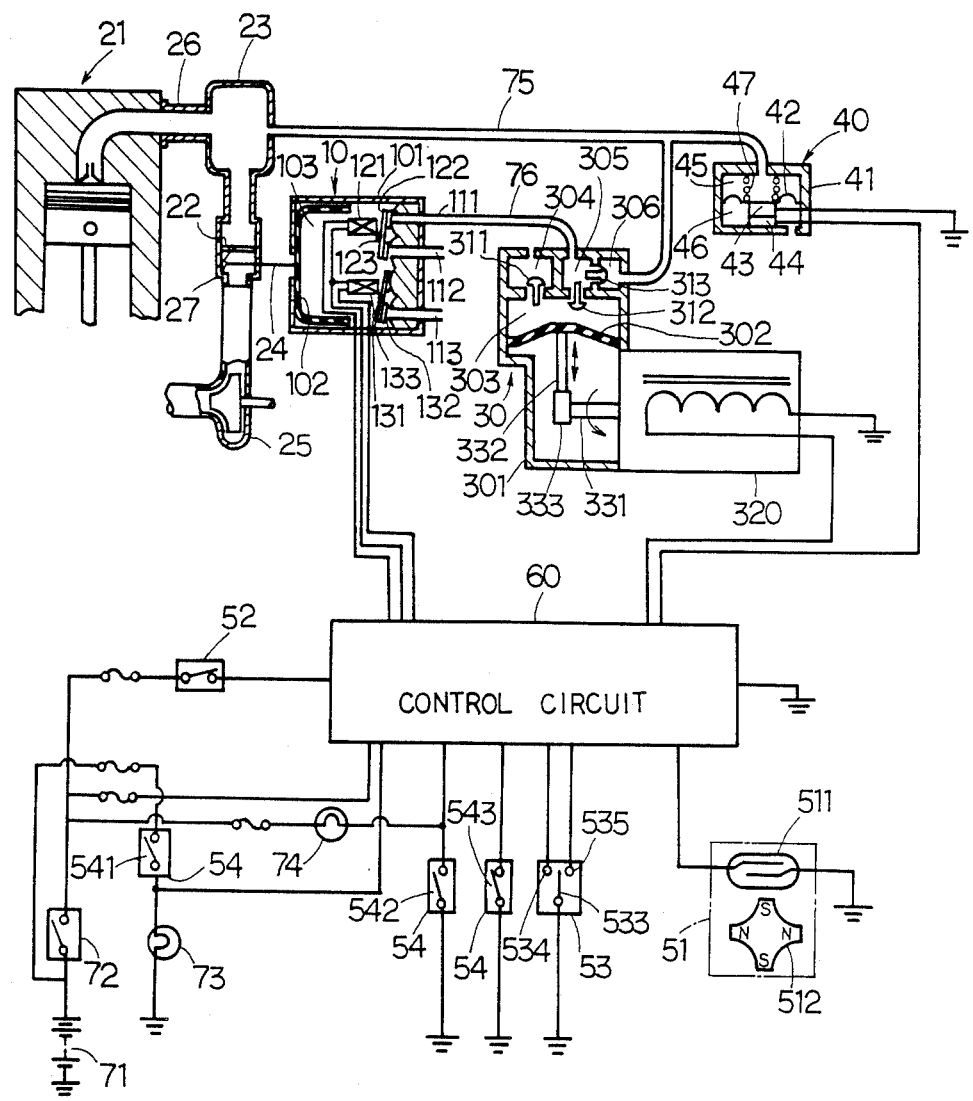
FIG. 4 is a schematic circuit illustrating an embodiment of the present invention.

FIG. 4 shows a schematic circuit illustrating an embodiment of the present invention. The actuator 10 is a conventional vacuum actuator which has a casing 101 and a diaphragm 102. A chamber 103 is defined between the casing 101 and the diaphragm 102. The diaphragm 102 is connected to the throttle valve 22 by a link mechanism 24. The chamber 103 has a first port 111, a second port 112 and a third port 113. The chamber 103 can introduce a vacuum through the first port 111, and normally communicates with the atmosphere around the casing 101 through the second and third ports 112 and 113. A spring (not shown in drawings) is located within the chamber 103, and the spring biases the diaphragm 102 to push the link mechanism 24 out. The throttle valve 22 is mounted rotatably on a throttle body 27 which connects a surge tank 23 to a turbocharger 25. When the link mechanism 24 is pushed out, the throttle valve 22 is closed, and there is no communication between the surge tank 23 and the turbocharger 25. Conversely, when vacuum is introduced into the chamber 103, the diaphragm 102 is displaced to pull the link mechanism 24 into the casing 101 against the bias force of the spring, thus opening the throttle valve. The amount of opening of the throttle valve 22 depends on the amount of vacuum introduced into the chamber 103.

The actuator 10 further includes a first valve 122 and a second valve 132. The first and second valves 122 and 132 are rotatably mounted on first and second shafts 123 and 133 respectively. The first valve 122 is biased by a spring (not shown in Figures) to close the first port 111 and to open the second port 112. The second valve 132 is biased by a spring (not shown in Figures) to open the third port 113.

The chamber 103, therefore, normally communicates with the atmosphere around the actuator 10, and the link mechanism 24 is pushed out. As a result, the throttle valve 22 is completely closed.

When electricity is supplied to first and second coils 121 and 131 from a control circuit 60, the first valve 122 opens the first port 111 and closes the second port 112 and the second valve 132 closes the third port 113. A vacuum is, therefore, introduced into the chamber 103 through the first port 111, and the link mechanism 24 is pulled in, thereby opening the throttle valve 22.

The first port 111 of the actuator 10 is connected to a first chamber 305 of a conventional vacuum pump 30 by a first conduit 76. The vacuum pump 30 has a casing 301 and a diaphragm 302. A main chamber 303 is defined between the casing 301 and the diaphragm 302, and communicates with the first chamber 305 and a second chamber 304. A first check valve 312 is located between the first chamber 305 and the main chamber 303. The first check valve 312 can introduce the vacuum from the main chamber 303 into the first chamber 305 but prevents the vacuum from passing from the first chamber 305 into the main chamber 303. A second check valve 311 is located between the second chamber 304 and the main chamber 303. The second check valve 311 can introduce air from the main chamber 303 into the second chamber 304, but prevents air from passing from the second chamber 304 into the main chamber 303. The second chamber 304 communicates with the atmosphere around the vacuum pump 30. The vacuum pump 30 has a third chamber 306 which communicates with the first chamber 305. A third check valve 313 is located between the first chamber 305 and the third chamber 306. The third check valve 313 can introduce a vacuum from the third chamber 306 into the first chamber 305, but prevents a vacuum from being introduced from the first chamber 305 into the third chamber 306. The third chamber 306 communicates with a surge tank 23 through a second conduit 75. The vacuum pump 30 further includes a spring (not shown in drawings) and a motor 320 which has an eccentric cam 333 on an output shaft 331. Electricity is supplied to the motor 320 from the control circuits 60. A rod 332 is located between the eccentric cam 333 and the diaphragm 302 is moved up and down when the motor 320 is driven. The spring is positioned in the main chamber 303 and the spring biases the diaphragm 302 to approach to the eccentric cam 333.

When the diaphragm 302 is pushed upwardly by the rod 322 and the eccentric cam 333, air is exhausted from the main chamber 303 through the second check valve 311. When the diaphragm 302 is pushed downwardly by the spring, a vacuum is introduced into the first chamber 305 and the first conduit 76 through the first check valve 312.

The surge tank 23, which is in communication with the third chamber 306, is connected to an intake manifold 26 of an engine 21. Therefore, when the turbocharger 25 is not driven a vacuum is introduced through the second conduit 75 into the third chamber 306, the first chamber 305, and the first conduit 76.

When the turbocharger 25 is driven, the surge tank 23, the second conduit 75, and the third chamber 306 are pressurized by air pressure caused by the turbocharger 25. The third check valve 313 prevents air pressure from being introduced into the first chamber 305.

The second conduit 75 is connected to a conventional vacuum switch 40 which has a casing 41 and a diaphragm 42. Upper and lower chambers 45 and 46 are defined between the casing 41 and the diaphragm 42. The upper chamber 45 communicates with the surge tank 23 through the second conduit 75 and the lower chamber 46 communicates with the atmosphere around the vacuum switch 40. A spring 47 is located within the upper chamber 45 and the spring 47 biases the diaphragm 42 downwardly. The diaphragm 42 has a contact 43 on a lower surface thereof and the casing 41 has another contact 44 on an inner bottom surface thereof. The contact 43 contacts with the contact 44 through the bias force of the spring 47. The contact 43 is separated from the contact 44 when the vacuum is introduced into the upper chamber 45 through the second conduit 75.

The contact 43 is connected to a ground, and the contact 44 is connected to the control circuit 60.

The control circuit 60 is connected to a battery 71 through an ignition switch 72, a fuse and a main switch 52. A setting switch 53, cancel switches 54 and the vehicle speed sensor 51 are connected to the control circuit 60.

The vehicle speed sensor 51 includes a rotator 512 of permanent magnets and a reed switch 511. The rotator 512 is rotated in proportion to the rotation of a vehicle axis and is turned by a speedometer cable of the vehicle. The reed switch 511 switches on and off in accordance with the revolution of the rotator 512 and the frequency of the operation of the reed switch 511 is in proportion to the vehicle speed. When the main switch 52 is turned on by the driver, a voltage signal is supplied from the battery 71 to the control circuit 60 through the ignition switch 72. The setting switch 53 includes a movable contact 533 and first and second secured contacts 534 and 535. When the movable contact 533 is in contact with the first secured contact 'FC' 534, the setting switch 53 outputs a setting signal into the control circuit 60. When the movable contact 534 is in contact with the second secured contact 'SC' 535, the setting switch 53 outputs a resume signal to the control circuit 60. The movable contact 533 returns to the neutral position after the operation force is removed from the movable contact 533.

The cancel switches 54 includes a first, second and third cancel switches 541, 542 and 543. The first cancel switch 541 is activated when a brake pedal is displaced and a stop lamp 73 is turned on. The first cancel switch 541 is located between the stop lamp 73 and the battery 71. A cancel signal is inputted into the control circuit 60 when the first cancel switch 541 is activated. The second cancel switch 542 is activated when a parking brake is displaced. The second cancel switch 542 is connected to the battery 71 through a parking lamp 74, a fuse, and an ignition switch 72. A cancel signal is inputted to the control circuit 60 when the ignition switch 72 and the second cancel switch 542 are activated. The third cancel switch 543 is activated when a clutch pedal is displaced and a clutch is disconnected or when a shift lever of an automatic transmission is displaced to a neutral position or to a parking position. The third cancel switch 543 outputs a cancel signal to the control circuit 60, when the third cancel switch 543 is turned on.

Figure 5:
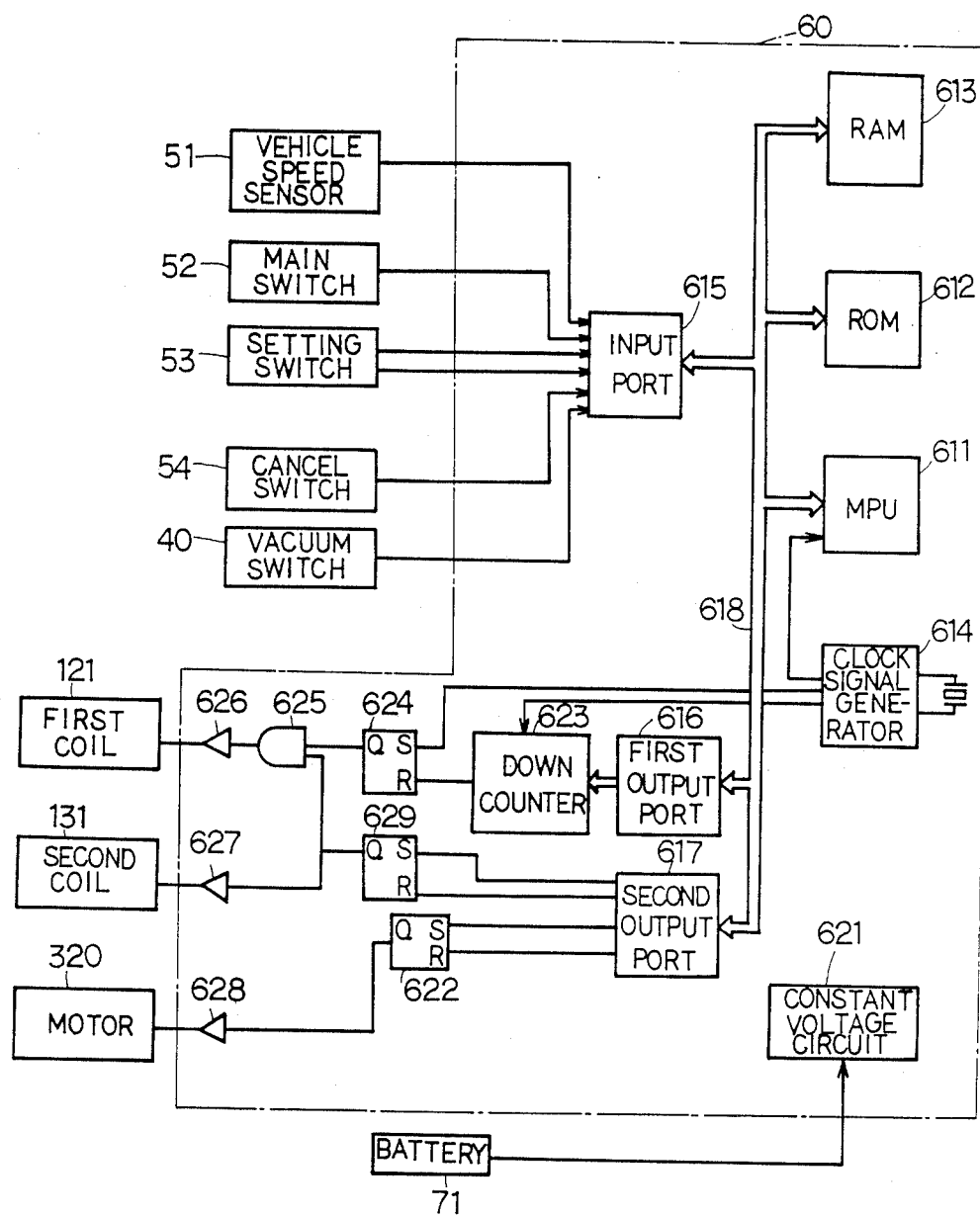
FIG. 5 is a block diagram illustrating a control circuit of the embodiment shown in FIG. 4.

FIG. 5 shows the control circuit 60 in detail. The control circuit 60 includes a microprocessor 'MPU' 611, a read only memory 'ROM' 612, a random access memory 'RAM' 613, an input port 615 and first and second output ports 616 and 617, which are connected each other by a common bas 618. The control circuit 60 includes a clock signal generator 614 which supplies a clock signal to MPU 611 and a downcounter 623. Further, the control circuit 60 includes a first set-reset flip-flop 624, the downcounter 623 and an and circuit 625, which output a first signal into the first coil 121, a second set-reset flip-flop 629 which outputs a second signal into the second coil 131, and a third set-reset flip-flop 622 which outputs a third signal into the motor 320 of the vacuum pump 30.

A first buffer resistor 627 is located between and the and circuit 625 and the first coil 121. A second buffer resistor 627 is located between the second flip-flop 629 and the second coil 131. A third buffer resistor 628 is located between the third flip-flop 622 and the motor 320 of the vacuum pump 30. The control circuit 60 further includes a constant voltage circuit 621 for supplying constant voltage to several components of the control circuit 60 from the battery 71.

The input port 615 receives the vehicle speed signal outputted from the vehicle speed sensor 51, a main switch signal outputted from the main switch 52, the setting signal or the resume signal outputted from the setting switch 53, the cancel signal outputted from the cancel switches 54, and a vacuum switch signal outputted from the vacuum switch 40. At least one of the main switch signal, the setting signal, the resume signal, the cancel signal and the vacuum switch signal is outputted from the input port 615 to the MPU 611 in accordance with the request from the MPU 611. The vehicle speed signal is outputted from the input port 615 into the MPU 611 without any request from the MPU 611 and the vehicle speed signal makes the MPU 611 initiate a conventional routine stored into the ROM 612 for calculating the actual vehicle speed. The calculated actual vehicle speed is stored in a predetermined position in the RAM 613.

The MPU 611 supplies a presetting number signal to the first output port 616 through the common bas 618 and the presetting number signal is inputted from the first output port 616 into the downcounter 623. The downcounter 623 counts down a value 'Vc' of the presetting number signal according to the clock signal inputted from the clock signal generator 614. When the downcounter 623 counts 'Zero', the downcounter 623 outputs the end signal into a reset terminal 'R' on the first flip-flop 624. A set terminal 'S' on the first flip-flop 624 receives the initial signal outputted from the clock signal generator 614. The first flip-flop 624 outputs the first signal from an output terminal 'Q' during a first time period. The first time period is initiated when the set terminal 'S' receives the initial signal. The time period ends when the reset terminal 'R' receives the end signal. The first signal inputs from the output terminal 'Q' into the first coil 121 through the and circuit 625 and the buffer resistor 626.

If the initial signal inputted into the set terminal 'S' has 10 Hz frequency, and the clock signal inputted into the downcounter 623 from the clock signal generator 614 has 1 KHz frequency, the value 'Vc' of the presetting number signal inputted from the first output port 616 into the downcounter 623 is 50, a maximum value 'VcMax' of the presetting number signal is 100, then the initial signal inputted from the first flip-flop 624 into the first coil 121 has 100 millisecond frequency and the pulse duty factor of the first coil 121 becomes 50%.

The second output port 617 outputs first turn-on and turn-off signals for inputting into the second coil 131 through the second flip-flop 629 and the buffer register 627, and a second turn-on and turn-off signals for inputting into the motor 320 through the buffer register 628. The first turn-on signal is inputted into a set terminal 'S' of the second flip-flop 629, and the first turn-off signal is inputted into a reset terminal 'R' of the second flip-flop 629. The second signal is outputted from the output terminal 'Q' of the second flip-flop 629 during a second time period. The second time period is initiated, when the set terminal 'S' receives the first turn-on signal. The second time period ends when the reset terminal 'R' receives the first turn-off signal. The second signal is inputted into the and circuit 625 and into the second coil 131 through the buffer resistor 627.

The second turn-on signal is inputted into a set terminal 'S' of the third flip-flop 622, and the second turn-off signal is inputted into a reset terminal 'R' of the third flip-flop 622. The third signal is outputted from the output terminal 'Q' of the third flip-flop 622 during a third time period. The third time period is initiated, when the set terminal 'S' receives the second turn-on signal. The third time period ends, when the reset terminal 'R' receives the second turn-off signal.

The motor 320 is driven and the vacuum pump 30 generates a vacuum when the motor 320 receives the third signal from the third flip-flop 622.

Figure 6:
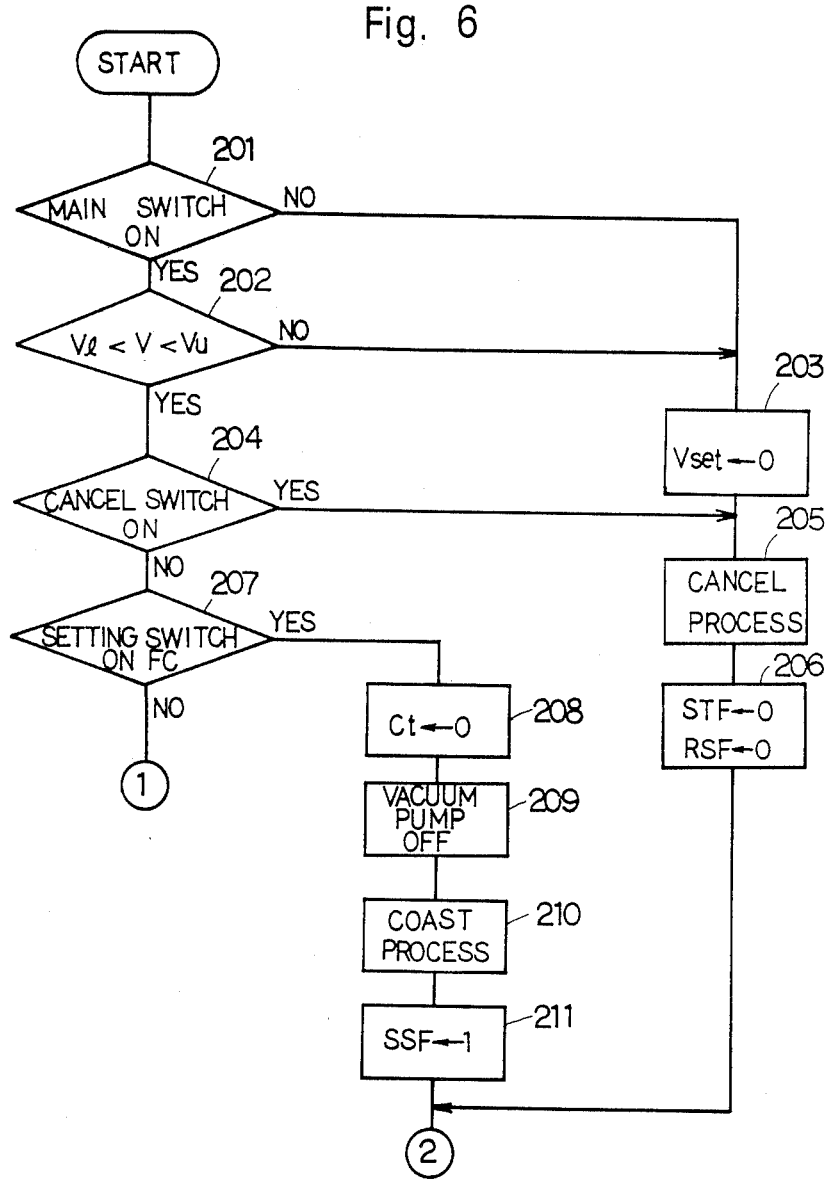
FIG. 6 is a first part of a flow chart illustrating a program for controlling the actual vehicle speed.
Figure 7:
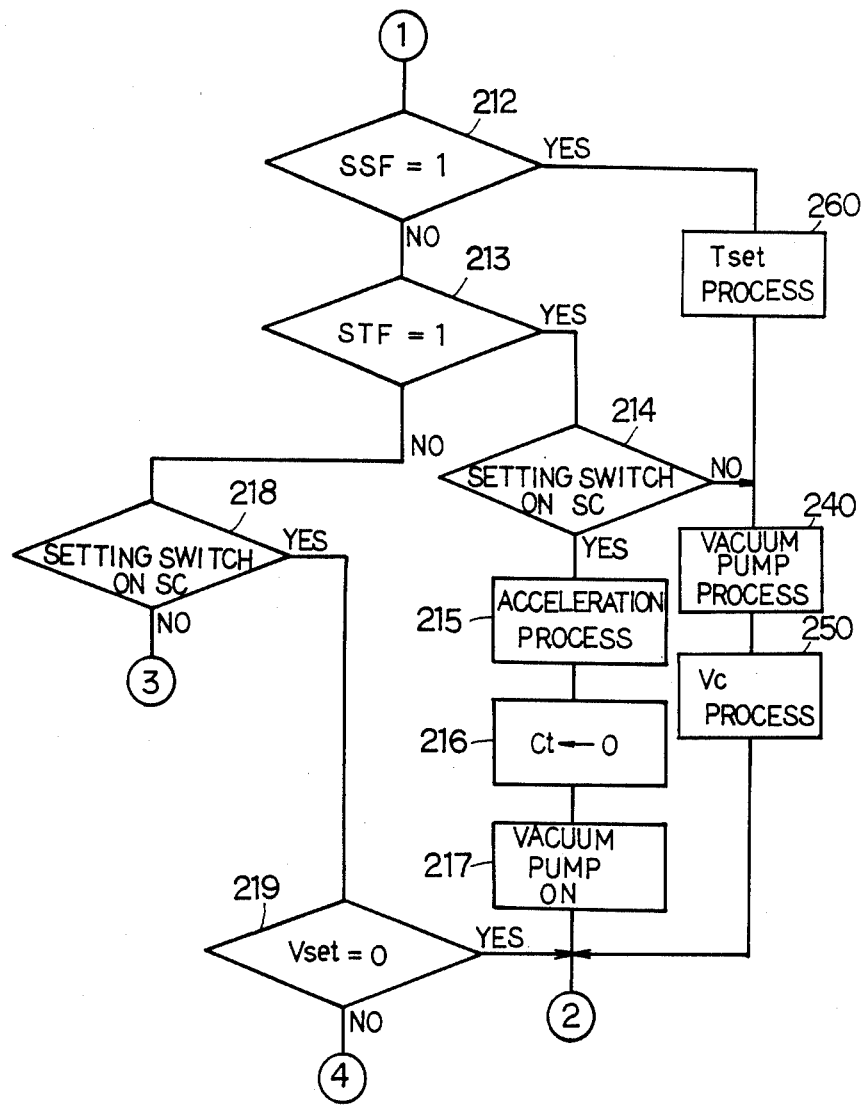
FIG. 7 is a second part of the flow chart illustrting the program for controlling the actual vehicle speed.
Figure 8:
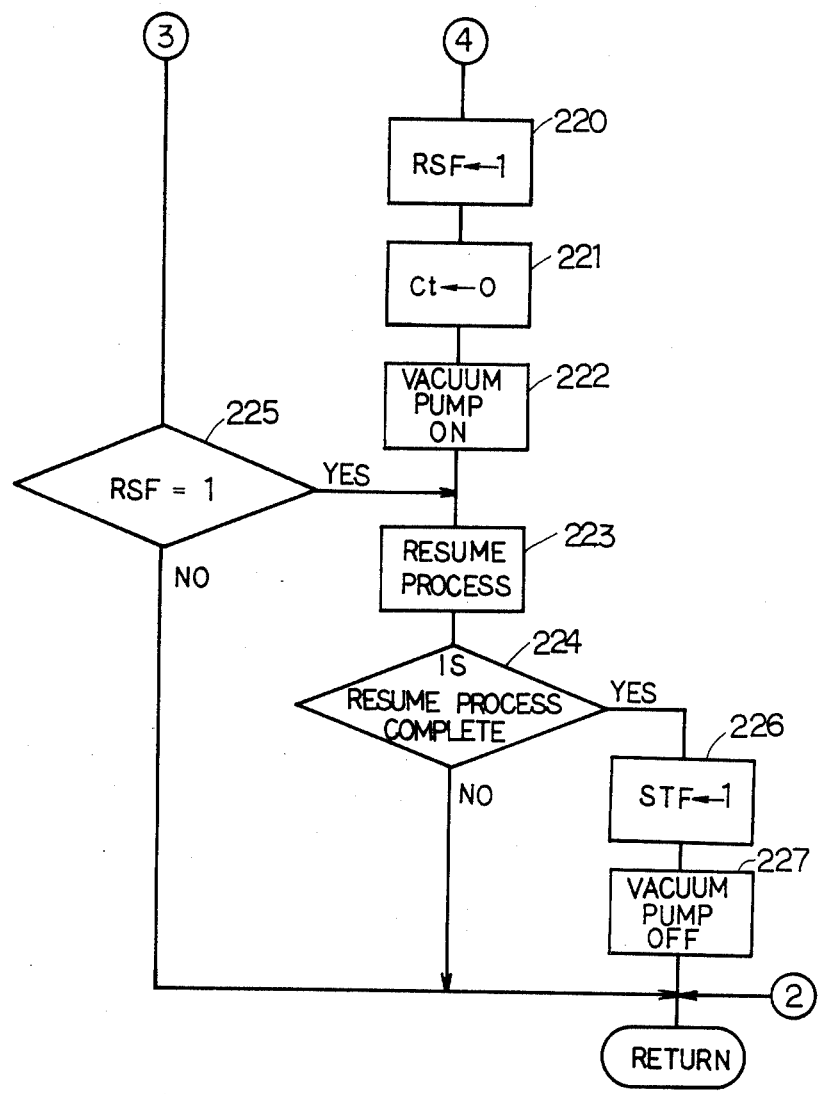
FIG. 8 is a third part of the flow chart illustrating the program for controlling the actual vehicle speed.

FIGS. 6 through 11 show flow charts illustrating a program for maintaining the actual vehicle speed at the desired vehicle speed. The flow chart disclosed in FIGS. 6 through 8 shows a routine which is initiated at predetermined time intervals. Step 201 detects whether the main switch 52 is turned on. When the main switch 52 is turn on, step 202 is carried out. In step 202, the calculated value 'V' of the actual vehicle speed stored at a predetermined position on the RAM 613 is compared with upper and lower limits 'Vu' and 'Vl' as shown in FIG. 2 and stored in the ROM 612. Step 202 detects whether the calculated value 'V' of of the actual vehicle speed is between the upper and lower limits 'Vu' an 'Vl'. In this embodiment, the upper limit 'Vu' is 136 km/hour and the lower limit 'Vl' is 48 km/hour. When the calculated value 'V' of the actual vehicle speed is not between the upper and lower limits 'Vu' and 'Vl', or the main switch 52 is turned off, step 203 is carried out. The value 'Zero' is set at a predetermined position on the RAM 613 as the value 'Vset' of the desired actual vehicle speed, and then steps 205, 206 are carried out and the routine ends.

When the calculated value 'V' of the actual vehicle speed is between the upper and lower limits 'Vu' and 'Vl', step 204 is carried out. Step 204 detects whether at least one of the first, second and third cancel switches 54 is turned on. When none the cancel switches 54 are turned on, step 207 is carried out. Step 207 detects whether the setting signal is inputted from the setting switch 53 to the control circuit 60, i.e. whether the movable contact 533 of the setting switch 53 is in contact with the first secured contact 'FC' 534. When the setting signal is inputted from the setting switch 53 into the control circuit 60, steps 208 through 211 are carried out. In step 211, a setting switch flag 'SSF', which means that the setting signal is inputted into the control circuit 60, is memorized, and the routine ends.

When the setting signal is not inputted to the control circuit 60, step 212 is carried out. The step 212 detects whether the setting switch flag "SSF" was memorized. If the setting switch flag "SSF" was memorized, steps 260, 240 and 250 are carried out.

Figure 9:
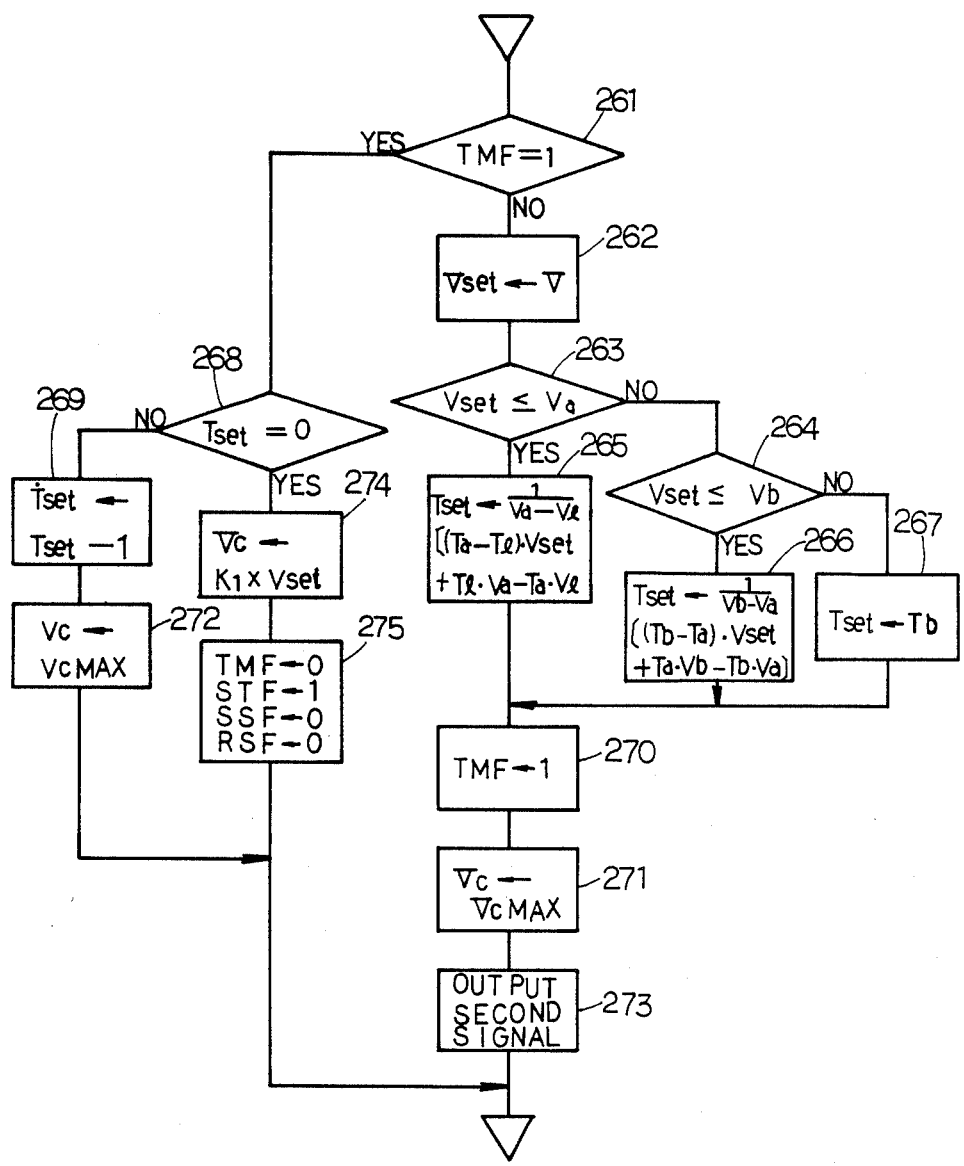
FIG. 9 is a flow chart illustrating the Tset process shown in FIG. 7.

FIG. 9 shows a flow chart of a Tset process in the step 260 shown in FIG. 7. Step 261 detects whether a timer flag "TMF" is set. When the timer flag 'TMF', which means that a time period 'Tset' has been memorized, is not memorized, step 262 is carried out. In step 262, the calculated value 'V' of the actual vehicle speed memorized in the RAM 613 is stored at a predetermined position on the RAM 613 as the value 'Vset' of the desired vehicle speed, and step 263 is carried out. Step 263 determines whether the value 'Vset' of the desired vehicle speed is lower than a first predetermined value 'Va' which is shown in FIG. 2. When the value 'Vset' of the desired vehicle speed is not lower than the first predetermined value 'Va', step 264 is carried out. Step 264 determines whether the value 'Vset' of the desired vehicle speed is lower than a second predetermined value 'Vb'. When the value 'Vset' of the desired vehicle speed is lower than the first predetermined value 'Va', step 265 is carried out. Step 265 calculates the time period 'Tset' for outputting the maximum value signal in accordance with a formula as follows:

$$Tset = [(Ta - Tl) \cdot Vset + Tl \cdot Va - Ta \cdot Vl)]/(Va - Vl)$$

wherein, Vl is the lower limit and Va is the first predetermined value of the desired vehicle speed shown in FIG. 2.

When the value 'Vset' of the desired vehicle speed is between the first predetermined value 'Va' and the second predetermined value 'Vb', step 266 is carried out. Step 266 calculates the time period 'Tset' for outputting the maximum value signal in accordance with a formula as follows:

$$Tset = [(Tb - Ta) \cdot Vset + Ta \, Vb - Tb \cdot Va)]/(Vb - Va)$$

wherein, Vb is the second predetermined value shown in FIG. 2.

When the value 'Vset' of the desired vehicle speed is greater than the second predetermined value 'Vb', step 267 is carried out. Step 267 determines the second predetermined value 'Tb' which is the time period 'Tset' for outputting the maximum value signal.

When the value 'Vset' of the desired vehicle speed is determined, steps 270, 271 and 273 are carried out. Step 270 memorizes that the timer flag 'TMF' is memorized, and in step 271 the first output port 616 outputs the maximum value 'VcMax' of the presetting number signal, as the maximum value signal. The second output port 617 outputs the second turn-on signal into the second flip-flop 629 which outputs the second signal in step 273. Thus, electricity is supplied to the second coil 131 and the second valve 132 closes the third port 113.

Figure 10:
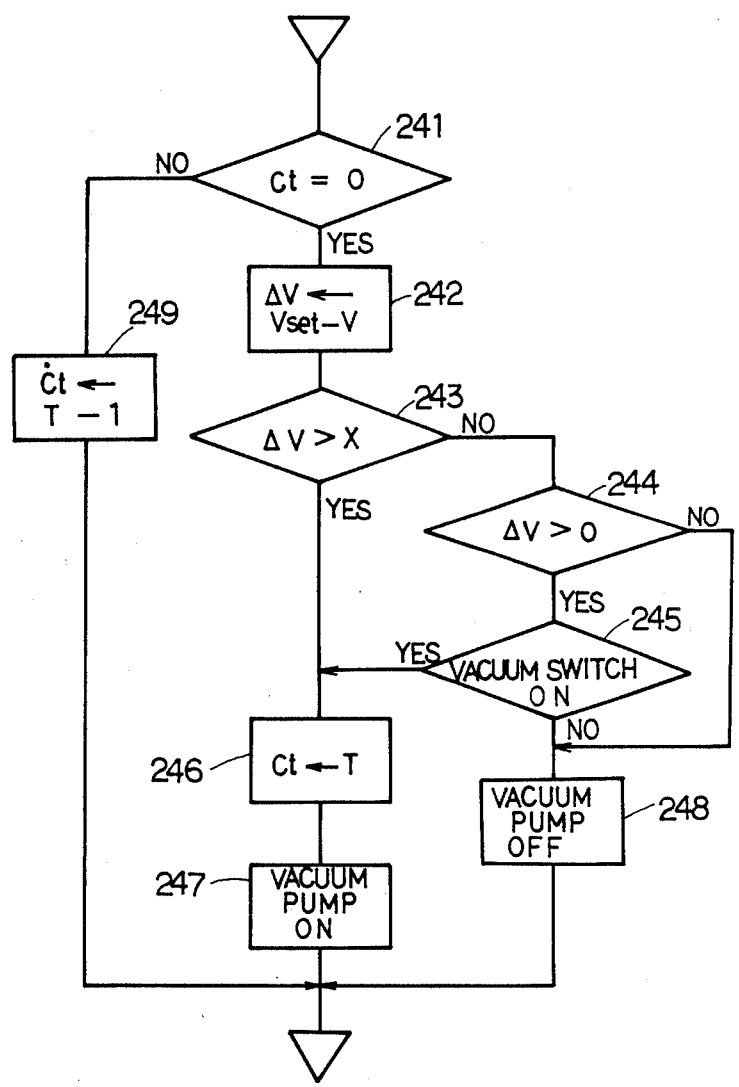
FIG. 10 is a flow chart illustrating the vacuum pump process shown in FIG. 7.

Step 240 is carried out after the step 260. FIG. 10 shows in detail step 240 which is the vacuum pump process shown in FIG. 7. Step 241 detects whether a timer counter 'Ct' reaches 'Zero'. When the timer counter 'Ct' reaches 'Zero', step 242 is carried out. Step 242 calculates the difference 'ΔV' between the value 'Vset' of the desired vehicle speed and the value 'V' of the actual vehicle speed. Step 243 then determines whether the difference 'ΔV' is larger than a predetermined value 'X'. Step 244 then detects whether the difference 'ΔV' is not larger than the predetermined value 'X', a step 244 is carried out and the step 244 detects whether the difference 'ΔV' is larger than 'Zero'. If the value 'Vset' of the desired vehicle speed is equal to the value 'V' of the actual vehicle speed, i.e. the difference 'ΔV' is 'Zero', step 248 is carried out. In step 248, the second output port 617 outputs a second turn-off signal into the reset terminal 'R' on the third flip-flop 622. As a result, the third signal is not outputted from the output terminal 'Q' of the third flip-flop 622 and electricity is not supplied to the motor 320 of the vacuum pump 30.

Figure 11:
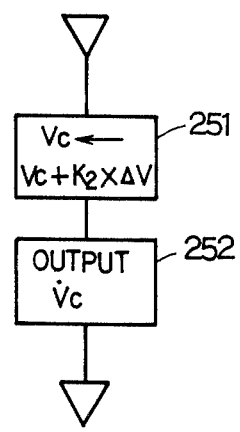
FIG. 11 is a flow chart illustrating the Vc process shown in FIG. 7.
Figure 12:
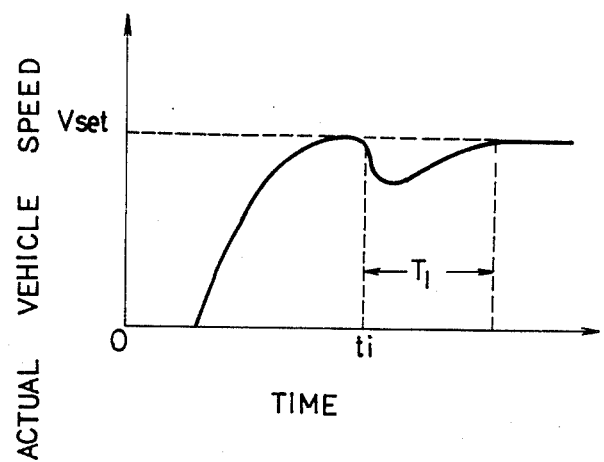
FIG. 12 is a graph showing the relationship between actual vehicle speed and time during control by a conventional vehicle speed control apparatus.
Figure 13:
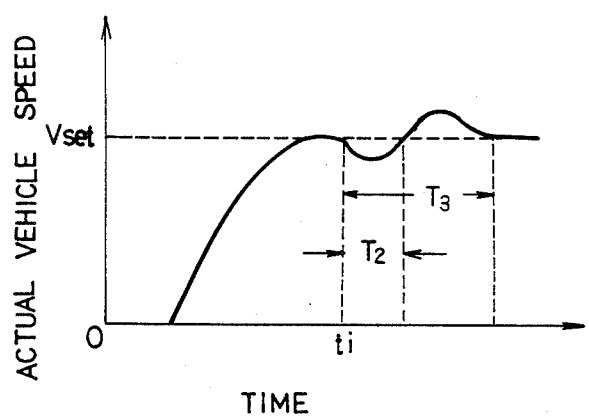
FIG. 13 is a graph showing the relationship between actual vehicle speed and time during control by another conventional vehicle speed control apparatus.

Step 250 is carried out after the step 240. FIG. 11 shows step 250, which is a Vc process, in detail. Step 251 compensates the value 'Vc' of the presetting number signal in accordance with the following formula:

$$\dot{V}c = Vc + K_2 \cdot \Delta V$$

wherein, $\dot{V}c$ is a compensated value of the presetting number signal, and $K_2$ is a constant.

In step 252, the compensated value '$\dot{V}c$' of the presetting number signal is outputted from the first output port 616 into the downcounter 623. The downcounter 623 outputs a reset signal to the reset terminal 'R' on the first flip-flop 624. The initial signal is inputted into the set terminal 'S' on the first flip-flop 624 simultaneously with the initiation of the routine.

Accordingly, the first signal, which is outputted from the output terminal 'Q' of the first flip-flop 624 during the first time period is in proportion to the compensated value '$\dot{V}c$' of the presetting number signal outputted from the output port 616.

The first signal outputted from the first flip-flop 624 and the second signal outputted from the second flip-flop 629 are inputted into the and circuit 625, and the first signal is inputted into the first coil 121 through the buffer registor 626 during the first time period in proportion to the compensated value '$\dot{V}c$' of the presetting number signal. Accordingly, the first valve 122 opens the first port 111 and closes the second port 112, and a vacuum is introduced into the chamber 103 of the actuator 10. The throttle valve 22 is then opened, and the driving of the vehicle at a constant vehicle speed is initiated.

When the step 260 determines the value 'Vc' of the presetting number signal outputted in the step 273 to be the maximum value 'VcMAX', the pulse duty factor of the first coil 121 becomes a maximum value. Accordingly, the time period, during which the first value 122 opens the first port 111 and closes the second port 112 thus rapidly introducing a vacuum into the chamber 103 of the actuator 10, is the longest.

In step 260 of the Tset process as shown in FIG. 9, when the timer flag 'TMF' was memorized a step 268 is carried out. Step 268 detects whether the time period 'Tset' for outputting the presetting number signal is 'Zero', wherein the time period 'Tset' is calculated by a formula as follows:

$$Tset = T_{Vc}/Tone$$

wherein, $T_{Vc}$ is a time period for outputting the presetting number signal 'Vc', and Tone is a time period for completing one routine.

When the time period 'Tset' for outputting the maximum presetting number signal is not 'Zero', step 269 is carried out. In step 269, the time period 'Tset' is counted down by a formula as follows:

$$\dot{T}set = Tset - 1$$

wherein, $\dot{T}set$ is a compensated time period for outputting the maximum presetting number signal 'VcMax'. Then, in step 272, the first output port 616 outputs the maximum presetting number signal 'VcMax'. Accordingly, vacuum is introduced into the chamber 103 of the actuator 10, unless the time period 'Tset' is 'Zero'.

When the time period 'Tset' is 'Zero', step 274 is carried out. In step 274, the first output port 616 outputs a value 'K$_1$·Vset' of the presetting number signal, wherein K$_1$ is a constant and Vset is the value 'Vset' of the desired vehicle speed. Accordingly, the pulse duty factor of the first coil 121 becomes a value in proportion to the value 'Vset' of the desired vehicle speed. Step 275 is carried out after step 274. In step 275, the timer flag 'TMF' is reset, and the set flag 'STF' is memorized. The set flag 'STF' means that the setting switch has been turned on and the cancel switch has not been turned on, i.e., the setting condition outputted by operation of the setting switch 53 is maintained. Concurrently, the setting switch flag 'SSF' and a resume flag 'RSF' are reset. The resume flag 'RSF' means that the resume signal is inputted into the control circuit 60.

Therefore, the first output port 616 outputs the value 'K$_1$·Vset' of the presetting number signal, during the time period 'Tset', which is in proportion to the value 'Vset' of the desired vehicle speed as shown in FIG. 2. As a result, the value of the initial decrease in the actual vehicle speed is reduced to a minimum value.

Unless the main switch 52, the setting switch 53 and the cancel switches 54 are operated, the main switch 52 is turned-on, the movable contact 533 of the setting switch 53 is positioned at the neutral position and the cancel switches 54 are turned-off. The set flag 'STF' is memorized and the setting switch flag 'SSF' is reset. In each routine, the steps 201, 202, 204, 207, 212, 213, 214, 240 and 250 are carried out. In step 240 i.e. the vacuum pump process, the second output port 617 outputs the second turn-on and turn-off signals in accordance with the value of the difference 'ΔV' into the third flip-flop 622, and the third signal is inputted into the motor 320 of the vacuum pump 30. As shown in FIG. 10, when the difference 'ΔV' is equal to or less than 'Zero' in the step 242, the steps 243, 244 and 248 are carried out. Accordingly, the second output port 617 outputs the second turn-off signal in the step 248, and the vacuum pump 30 is not driven.

When the difference 'ΔV' is more than 'Zero' and less than the predetermined value 'X' in step 242, steps 243, 244 and 245 are carried out. When the vacuum switch 40 is not turned on, step 248 is carried out and the vacuum pump 30 is not driven. When the vacuum switch 40 is turned on, step 246 is carried out, and a predetermined value 'T' is inputted into the timer counter. Then step 247 is carried out. Thus, the second output port 617 outputs the second turn-on signal into the set terminal 'S' on the third flip-flop 622. The third signal is then outputted from the output terminal 'Q' on the third flip-flop 622 into the motor 320 of the vacuum pump 30 through the buffer registor 628. As a result, the vacuum pump 30 is driven and a vacuum, generated by the vacuum pump 30, is introduced into the chamber 103 through the first port 111. Once the predetermined value 'T' is inputted into the timer counter, each routine takes steps 241 and 249. Step 249 counts down the predetermined value 'T' inputted into the timer counter by a formula as follows:

$$Ct = T - 1$$

wherein, Ct is a compensated value of the timer counter. Accordingly, the compensated value 'Ct' of the timer counter is reduced one by one in each routine. Unless the compensated value 'Ct' of the timer counter is 'Zero', the vacuum pump 30 is driven continuously.

When the difference 'ΔV' is more than the predetermined value 'X' in step 242, the steps 243, 246 and 247 are carried out. In the same manner discussed above, the vacuum pump 30 is driven.

When the value of the difference 'ΔV' becomes equal to or less than 'Zero', or when the value of the difference 'ΔV' becomes the value defined between 'Zero' and the predetermined value 'X', and the vacuum switch is not turned on, step 248 is carried out. In step 248, the second output port 617 outputs the second turn-off signal into the reset terminal 'R' on the third flip-flop 622, and the third flip-flop 622 does not output the third signal into the motor 320 of the vacuum pump 30. Accordingly, the vacuum pump 30 is stopped.

In step 250 i.e. the Vc process, the value 'Vc' of the presetting number signal is compensated, and the first outport port 616 outputs the compensated value 'Vc' of the presetting number signal.

When the movable contact 533 of the setting switch 53 contacts with the second secured contact 'SC' 535 during the driving of the vehicle at a preset desired vehicle speed, the desired vehicle speed is increased. In the routine, the steps 201, 202, 204, 207, 212, 213, 214, 215, 216 and 217 are carried out. In step 215, i.e. the acceleration process, the first output port 616 outputs the maximum value 'VcMAX' of the presetting number signal. The newly desired vehicle speed is not memorized until the movable contact 533 is released from the second secured contact 'SC' 535. The pulse duty factor of the first coil 121 becomes a maximum value, and the time period in which the first valve 122 opens the first port 111 and closes the second port 112 is long. The vacuum generated in the vacuum pump 30, therefore, is introduced rapidly into the chamber 103 and the opening amount of the throttle valve 22 is a maximum. As a result, the vehicle accelerates rapidly.

When the newly desired vehicle speed is attained, the movable contact 533 of the setting switch 53 is released from the second secured contact 'SC' 535. At this point, steps 201, 202, 204, 207, 212, 213, 214, 240 and 250 are carried out. The vehicle is then driven constantly at the newly desired vehicle speed.

In step 216, the value 'Ct' of the timer counter is cleared, and in step 217, a turn-on signal is inputted into the third flip-flop 622 and the third signal is inputted into the vacuum pump 30. Accordingly, the acceleration process in the step 215 is maintained, and the vacuum pump 30 is driven continuously while the movable contact 533 is in contact with the second secured contact 'SC' 535.

When the movable contact 533 of the setting switch 53 contacts the first secured contact 'FC' 534 during the driving of the vehicle at the preset vehicle speed, the actual vehicle speed is decreased. In the routine, steps 201, 202, 204, 207, 208, 209, 210 and 211 are carried out. In step 208, the value 'Ct' of the timer counter is cleared, and in the step 209, a turn-off signal is inputted into the third flip-flop 622 and the third signal is stopped. In step 210, i.e. a coast process, the first output port 616 outputs a value 'Zero' as the presetting number signal and the second output port 617 outputs the first turn-off signal into the reset terminal 'R' of the second flip-flop 629. A decreased value of the desired vehicle speed is not memorized until the movable contact 533 is released from the first secured contact 'FC' 534.

Accordingly, the first and second signals are not outputted from the output terminals 'Q' of the first and second flip-flops 624 and 629, and electricity is not supplied to the first and second coils 121 and 131. As a result, the first valve 122 closes the first port 111 and opens the second port 112, and the second valve 133 opens the third port 113. The atmosphere around the actuator 10 is introduced rapidly, and the throttle valve 22 is closed completely. The actual vehicle speed is decelerated gradually. In step 211, after step 210, the setting switch flag 'SSF' is memorized. The vacuum pump 30, therefore, is not driven while the movable contact 533 is in contact with the first secured contact 'FC' 534. The coast process in the step 210, therefore, is maintained.

After a desired decreased vehicle speed is attained and the movable contact 533 of the setting switch 53 is released from the first secured contact 'FC' 534, in the routine, the steps 201, 202, 204, 207, 212 and 260 are carried out. In the step 262 of the Tset process, the decreased value of the desired vehicle speed is memorized as the value 'Vset' of the desired vehicle speed. The vehicle, therefore, is driven at the desired decreased vehicle speed. The value 'Vc' of the presetting number signal becomes the maximum value 'VcMAX' of the presetting number signal during the time period 'Tset', and the step 260 i.e. the Tset process is carried out, so that the setting switch flag 'SSF' is reset and the set flag 'STF' is memorized. As a result, the steps 201, 202, 204, 207, 212, 213, 214, 240 and 250 are carried out, and the driving of the vehicle at the desired decreased vehicle speed is maintained.

When at least one of the cancel switches 54 is turned on, i.e. at least one of the brake and clutch pedals is displaced or the parking brake is in the braking condition, steps 201, 202, 204, 205 and 206 in the routine are carried out. In step 205 i.e. the cancel process, the first output port 616 outputs the value 'Zero' as a newly presetting number signal, and the second output port 617 inputs the first turn-off signal into the reset terminal 'R' of the second flip-flop 629. In step 206 the set flag 'STF' and the resume flag 'RSF' are reset.

Electricity is, therefore, not inputted into the first and second coils 121 and 123, and the first valve 122 of the actuator 10 opens the second port 112 and closes the first port 111, and the second valve 132 opens the third port 113. The atmosphere around the actuator 10 is rapidly introduced into the chamber 103 of the actuator 10, and the throttle valve 22 is closed completely. The maintenance of the speed of the vehicle at the desired vehicle speed is therefore ended. In this condition, when an accelerator pedal (not shown in drawings) is displaced by the driver, the throttle valve 22 is opened by the accelerator pedal instead of the actuator 10.

While the main switch 52 is turned-on, and the actual vehicle speed is less than the lower limit 'Vl' or more than the upper limit 'Vu', in the routine, the steps 201, 202, 203, 205 and 206 are carried out.

Step 203 determines that the value 'Vset' of the desired vehicle speed is 'Zero', and the maintenance of the speed of the vehicle at the desired vehicle speed is ended.

When the vehicle is driven at a vehicle speed being between the lower and upper limits 'Vl' and 'Vu' but the automatic control of the vehicle speed by the vehicle speed control apparatus is canceled and the movable switch 533 is in contact with the second secured contact 'SC' 535, steps 201, 202, 204, 207, 212, 213, 218 and 219 in the routine are carried out. Step 219 detects whether the value 'Vset' of the desired vehicle speed is 'Zero', and when it is, the routine end. While the value 'Vset' of the desired vehicle speed is not 'Zero', the steps 220, 221, 222, 223, 224 are carried out. Step 220 sets up the resume flag 'RSF' which means the movable contact 533 of the setting switch 53 is in contact with the second secured contact 'SC' 535. In step 221, the value 'Ct' of the timer counter is cleared out, and in step 222, the vacuum pump 30 is driven. In step 233, i.e., a resume process, the value 'Vset' of the desired vehicle speed which was memorized remains in the 'RAM' 613.

When the difference 'ΔV', defined as the difference between the value 'Vset' of the desired vehicle speed, is large, the value 'Vc' of the presetting number signal, outputted from the first output port 616, is compensated to be the maximum value 'VcMax' of the presetting number signal or to be a minimum value 'VcMin' of the presetting number signal. As a result, when the difference 'ΔV' becomes smaller than a predetermined value 'Y' stored in the ROM 612, the value 'Vc' of the presetting number signal is further compensated to be an adequate value 'Vc ad' of the presetting number signal stored in the ROM 612 in order to prevent the value of the actual vehicle speed from exceeding the value 'Vset' of the desired vehicle speed. Step 224 detects whether the resume process is completed. When the resume process is not completed, steps 201, 202, 204, 207, 212, 213, 218, 225, 223 and 224 in the routine are carried out. Step 218 detects the movable contact 533 of the setting switch 53 is not in contact with the second secured contact 'SC' 535. Step 225 detects whether the resume flag 'RSF' is memorized. When the resume process is completed, steps 226 and 227 in the routine, are carried out after step 224. In step 226, the set flag is memorized, and in step 227, the vacuum pump 30 is stopped. As a result, the constant driving at the value 'Vset' of the desired vehicle speed is maintained.

The memorizing means shown in FIG. 1 corresponds to the steps 211, 212 and 262 shown in FIGS. 6, 7 and 9, and the comparator shown in FIG. 1 corresponds to the steps 242, 251 and 252 shown in FIGS. 9 and 10. Furthermore, the quick response means shown in FIG. 1 corresponds to the steps 271, 272 and 252 shown in FIGS. 9 and 10, and the timer corresponds to the steps 263 through 269 shown in FIG. 9.

When the vehicle speed control apparatus according to the present invention is driven at the desired vehicle speed, and when the difference 'ΔV' defined as the difference between the value 'V' of the actual vehicle speed and the value 'Vset' of the desired vehicle speed becames larger than the predetermined value 'X', the vacuum pump 30 is driven and a vacuum is introduced into the actuator 10. While the difference 'ΔV' is larger than 'Zero' and a vacuum is in the surge tank 23, the vacuum pump 30 is driven and a vacuum is introduced into the actuator 10.

However, when the value of difference 'ΔV' is equal to 'Zero' or when it is smaller than 'Zero', the vacuum pump 30 is not driven. When the value of 'ΔV' is larger than 'Zero' and smaller than the predetermined value 'X' and the vacuum switch 40 is turned off, i.e. there is a larger vacuum in the surge tank 23, the vacuum pump 30 is stopped and a vacuum is introduced into the actuator 10 from the surge tank 23, instead of from the vacuum pump 30.

When the resume switch 532 is turned on in order to accelerate the vehicle or when the resume switch 532 is turned on after the vehicle speed control is canceled in order to resume the vehicle speed control, the vacuum pump 30 is driven and a vacuum is introduced into the actuator 10.

It is apparent that a vacuum pump 30 is not necessary in the vehicle speed control apparatus according to the present invention.

While the present invention has been described in its preferred embodiment, it is to be understood that the invention is not limited thereto, and may be otherwise embodied within the scope of the following claims.

What is claimed is:

1. A vehicle speed control apparatus for maintaining an actual vehicle speed at a desired vehicle speed comprising:

a detecting means for detecting a value of actual vehicle speed and outputting an actual vehicle speed signal, the actual vehicle speed signal having a value substantially equal to the actual vehicle speed;

a commencing means for outputting an initial signal when said commencing means is triggered;

a memorizing means for setting in a memory a value of a desired vehicle speed, the actual vehicle speed signal outputted by said detecting means, and the initial signal outputted from said commencing means, said value of the desired vehicle speed being substantially equal to the value of the actual vehicle speed at the time the initial signal is outputted from said commencing means, and said memorizing means outputting the desired vehicle speed signal having the value of the desired vehicle speed at the time the initial signal is outputted from said commencing means said memorizing means memorizing a first predetermined time period corresponding to the desired vehicle speed, the first predetermined time period being shorter than the time period required for the actual vehicle speed to reach the desired vehicle speed;

a comparator means for determining a difference between the value of the desired vehicle speed signal and the value of the actual vehicle speed signal, said desired vehicle speed signal being inputted from the memorizing means into said comparator means, said actual vehicle speed being inputted from said detecting means into said comparator means and said comparator means outputting a first manipulation signal when the difference is larger than a first predetermined value;

a timer means for counting down a value of said first predetermined time period, said time period beginning when said desired vehicle speed signal is inputted to the timer means from said memorizing means, said timer means outputting an end signal at an end of the first predetermined time period, said end signal being outputted a second predetermined time period before the actual vehicle speed reaches the desired vehicle speed;

a quick response means for outputting a second manipulation signal during said time period, said second manipulation signal being initiated when the initial signal is inputted from said commencing means into said quick response means, said second manipulation signal ending when the end signal is inputted from said timer means into said quick response means; and an actuator means for opening a throttle valve when at least one of the first and second manipulation signals is inputted into the actuator means from said comparator means and said quick response means, the actuator means maintaining a maximum condition thereof when the second manipulation signal is outputted from the quick response means during said first predetermined time period, the actuator means opening the throttle value in accordance with the value of the desired vehicle speed when the second manipulation signal ends after said first predetermined time period.

2. The vehicle speed control apparatus of claim 1, wherein said detecting means is a vehicle speed sensor.

3. The vehicle speed control apparatus of claim 1, wherein said commencing means is a setting switch.

4. A vehicle speed control apparatus of claim 1, further comprising a main switch supplying electricity to the vehicle speed control apparatus from an electric source.

5. A vehicle speed control apparatus of claim 1, wherein said memorizing means has a relationship set in said memory, said relationship being between said value of the desired vehicle speed and said value of the time period, whereby for each value of desired vehicle speed in said memory there is a corresponding time period in said memory.

6. The vehicle speed control apparatus of claim 5, wherein the value of the first predetermined time period counted down by said timer means is inputted into said timer means from the memorizing means.

7. The vehicle speed control apparatus of claim 6, wherein the value of the first predetermined time period is determined by the value of the desired vehicle speed in accordance with said relationship.

8. The vehicle speed control apparatus of claim 7, wherein said relationship has an upper and a lower limit of the value of the desired vehicle speed.

9. The vehicle speed control apparatus of claim 8, wherein said memorizing means does not set in said memory the value of the desired vehicle speed when the value of the desired vehicle speed is less than said lower limit or more than said upper limit.

10. The vehicle speed control apparatus of claim 7, further comprising a cancellation means to cancel said first and second manipulation signals.

11. The vehicle speed control apparatus of claim 7, wherein said commencing means includes a first position and a neutral position and when said commencing means is displaced to said first position from said neutral position while the actual vehicle speed is maintained at the desired vehicle speed, said commencing means outputs a coast signal whereby said first and second manipulation signals are not outputted so that the actual vehicle speed is decreased from the desired vehicle speed.

12. The vehicle speed control apparatus of claim 11, wherein said commencing means is returned to said neutral position when said actual vehicle speed equals a decreased desired vehicle speed, thereby causing said coast signal from said commencing means to end, whereby said memorizing means sets in said memory a decreased value of the desired vehicle speed and whereby the actual vehicle speed is maintained at said decreased desired vehicle speed.

13. The vehicle speed control apparatus of claim 7, wherein said second manipulation signal is a maximum value signal during said predetermined time period and said actuator means opens said throttle valve to a maximum opening degree when the maximum value signal is inputted into said actuator means.

14. The vehicle speed control apparatus of claim 7, wherein at said end of said second manipulation signal said first manipulation signal is inputted to said actuator means whereby said actuator means opens said throttle valve to a degree proportional to the value of the difference between said desired vehicle speed and said actual vehicle speed, said proportional degree being memorized in said memorization means.

15. The vehicle speed control apparatus of claim 7, wherein said commencing means includes a second position and a neutral position and when said commencing means is displaced to said second position from a neutral position and when the actual vehicle speed is maintained at the desired vehicle speed, said commencing means outputs an acceleration signal into said quick response means whereby said quick response means outputs the second manipulation signal into said actuator means, so that the actual vehicle speed is increased from the desired vehicle speed.

16. The vehicle speed control apparatus of claim 15, wherein when the actual vehicle speed reaches an increased desired vehicle speed, said commencing means is displaced to the neutral position and said commencing means does not output the acceleration signal into the quick response means and said memorizing means memorizes a value of the increased desired vehicle speed, whereby the actual vehicle speed is maintained at the increased desired vehicle speed.

17. The vehicle speed control apparatus of claim 1, wherein the first predetermined value is 'Zero' so that said comparator means does not output said first manipulation signal when said difference between the value of the actual vehicle speed signal and the value of the desired vehicle speed signal is equal to or smaller than 'Zero'.

18. A vehicle speed control apparatus for maintaining an actual vehicle speed at a desired vehicle speed comprising:
- a vehicle speed sensor for detecting a value of the actual vehicle speed and outputting an actual vehicle speed signal being substantially equal to the actual vehicle speed;
- a setting switch for outputting an initial signal, said setting switch including a movable contact and a first secured contact, said setting switch being adapted to output the initial signal when the movable contact is in contact with the first secured contact;
- a cancel switch for outputting a cancel signal, said cancel switch outputting the cancel signal when said cancel switch is operated;
- a vacuum switch for detecting whether a surge tank has a vacuum, the surge tank being connected to an intake manifold of an engine and a throttle body, said vacuum switch connected to the surge tank, said vacuum switch adapted to output a vacuum signal when the surge tank does not have a vacuum;
- a control circuit for receiving the actual vehicle speed signal, the initial signal, the cancel signal and the vacuum signal and for outputting at least one of the first and second manipulation signals, said control circuit comprising:
  - a memorizing means for setting in a memory a value of the desired vehicle speed, the actual vehicle speed signal outputted by said vehicle speed sensor, and the initial signal outputted from said setting switch, said value of desired vehicle speed being substantially equal to the value of the actual vehicle speed at the time the initial signal is outputted from said setting switch, and said memorizing means outputting a desired vehicle speed signal having a value of the desired vehicle speed at the time the initial signal is outputted from said setting switch;
  - a comparator means for determining a difference between the value of the desired vehicle speed signal and a value of the actual vehicle speed signal, said desired vehicle speed signal being inputted from said memorizing means into said comparator means, said actual vehicle speed signal being inputted from said vehicle speed sensor into said comparator means and said comparator means outputting a first manipulation signal when the difference is larger than a first predetermined value;
  - a timer means for counting down a value of a previously set time period, said time period being initiated at the initial time at which the desired vehicle speed signal is inputted into the timer means from said memorizing means, said timer means outputting an end signal at an end time of the time period;
  - a quick response means for outputting a second manipulation signal during said time period, said second manipulation signal being initiated when the initial signal is inputted from said setting switch into said quick response means, said second manipulation signal ending when the end signal is inputted from said timer means into said quick response means; and
  - an actuator for operating the throttle valve, said actuator means including a coil, a valve and a first and second port, said actuator means opening the throttle valve when at least one of the first and second manipulation signal is inputted into the actuator means from said comparator means and said quick response means of said control circuit.

19. The vehicle speed control apparatus of claim 18, further comprising a vacuum pump for generating a vacuum when said control circuit outputs the second manipulation signal into the vacuum pump.

20. The vehicle speed control apparatus of claim 18, wherein said setting switch further comprises a second secured contact, said second secured contact adapted to output a resume signal when said movable contact is in contact with said second secured contact.

21. A method for maintaining an actual vehicle speed at a desired vehicle speed, said method comprising the steps of:
- detecting an actual vehicle speed and outputting an actual vehicle speed signal to a memory;
- outputting an initial desired vehicle speed signal when said actual vehicle speed is essentially equal to a desired vehicle speed;
- setting said desired vehicle speed signal in said memory;
- reading a first predetermined time period corresponding to said desired vehicle speed from said memory;
- storing, in said memory, a first predetermined time period which is shorter than the time period required for actual vehicle speed to reach said desired vehicle speed;
- comparing said desired vehicle speed to said actual vehicle speed and determining a difference between said actual vehicle speed and said desired vehicle speed;

outputting a first manipulation signal in accordance with said difference between said actual vehicle speed and said desired vehicle speed;

outputting a second manipulation signal of a maximum value during said first predetermined time period;

ending said second manipulation signal a second predetermined time period before said actual vehicle speed reaches the desired vehicle speed;

opening a throttle valve to a maximum amount during said first predetermined time period in response to said second manipulation signal of maximum value; and at said end of said second manipulation signal, opening said throttle valve in response to said first manipulation signal.

22. The method for maintaining an actual vehicle speed at a desired vehicle speed according to claim 21, wherein at said end of said second manipulation signal, said first manipulation signal is inputted to said actuator means whereby said actuator means opens said throttle valve in an amount proportional to the value of the difference between said desired vehicle speed and said actual vehicle speed, said proportional degree being memorized in said memory.

23. The method for maintaining an actual vehicle speed at a desired vehicle speed according to claim 21, further comprising setting said desired vehicle speed in said memory only when said desired vehicle speed is greater than a lower limit and less than an upper limit.

24. The method for maintaining an actual vehicle speed at a desired vehicle speed according to claim 21, further comprising cancelling said first manipulating signal and said second manipulation signal to end said maintenance of actual vehicle speed.

25. The method for maintaining an actual vehicle speed at a desired vehicle speed according to claim 21, further comprising outputting a coast signal whereby said first manipulation signal and said second manipulation signal are not outputted, so that said actual vehicle speed is decreased from said desired vehicle speed.

26. The method for maintaining an actual vehicle speed at a desired vehicle speed according to claim 25, further comprising not outputting said coast signal when said actual vehicle speed equals a decreased desired vehicle speed, thereby setting in said memory a decreased value of the desired vehicle speed whereby the actual vehicle speed is maintained at said decreased desired vehicle speed.

27. The method for maintaining an actual vehicle speed at a desired vehicle speed according to claim 21, wherein said first manipulation signal is outputted only when said difference between said actual vehicle speed and said desired vehicle speed is larger than a first predetermined value.

28. The method for maintaining an actual vehicle speed at a desired vehicle speed according to claim 27, wherein said first predetermined value is zero so that said first manipulation signal is not outputted when said difference is equal to or smaller than zero.

29. The method for maintaining an actual vehicle speed at a desired vehicle speed according to claim 21, further comprising outputting an acceleration signal, whereby said second manipulation signal is outputted so that said vehicle speed is increased from said desired vehicle speed.

30. The method for maintaining an actual vehicle speed at a desired vehicle speed according to claim 29, further comprising ending said acceleration signal when said actual vehicle speed equals an increased desired vehicle speed, whereby the actual vehicle speed is maintained at the increased desired vehicle speed.

31. A method for maintaining an actual vehicle speed at a desired vehicle speed comprising:

detecting an actual vehicle speed and outputting an actual vehicle speed signal to a memory, said actual vehicle speed signal having a value substantially equal to said actual vehicle speed;

outputting an initial desired vehicle speed signal when said actual vehicle speed is substantially equal to a desired vehicle speed;

determining if said desired speed signal is greater than a predetermined lower value of less than a predetermined higher value;

setting said desired vehicle speed in said memory when said desired vehicle speed is greater than said lower value and less than said higher value;

comparing said desired vehicle speed set in said memory to actual vehicle speed and determining a difference between said actual vehicle speed and said desired vehicle speed;

outputting a first manipulation signal when said difference between said actual vehicle speed and said desired vehicle speed is greater than a predetermined value;

outputting a second manipulation signal of a maximum value for a first predetermined time period, said first predetermined time period being determined in said memory by a relationship set in said memory, said relationship being between said desired vehicle speed and said time period;

ending said second manipulation signal a second predetermined time period before the actual vehicle reaches the desired vehicle speed, at the end of said first predetermined time period; and opening a throttle valve to a maxium amount during said first predetermined time period in response to said second manipulation signal of maximum value and at said end of said second manipulation signal opening said throttle valve in response to said first manipulation signal when said desired vehicle speed is greater than said actual vehicle speed.

32. The method for maintaining an actual vehicle speed at a desired vehicle speed according to claim 31, wherein said first predetermined value is zero so that said first manipulation signal is not outputted when said difference is equal to or smaller than zero.

33. The method for maintaining an actual vehicle speed at a desired vehicle speed according to claim 32, further comprising outputting an acceleration signal, whereby said second manipulation signal is outputted so that said vehicle speed is increased from said desired vehicle speed.

34. The method for maintaining an actual vehicle speed at a desired vehicle speed according to claim 31, further comprising outputting a coast signal whereby said first manipulation signal and said second manipulation signal are not outputted, so that said actual vehicle speed is decreased from said desired vehicle speed.

35. The method for maintaining an actual vehicle speed at a desired vehicle speed according to claim 34, further comprising not outputting said coast signal when said actual vehicle speed equals a decreased desired vehicle speed, thereby setting in said memory a decreased value of the desired vehicle speed whereby the actual vehicle speed is maintained at said decreased desired vehicle speed.

* * * * *